Sept. 15, 1953 C. DEAN 2,652,218
HOSE NOZZLE SUPPORT
Filed Jan. 23, 1948
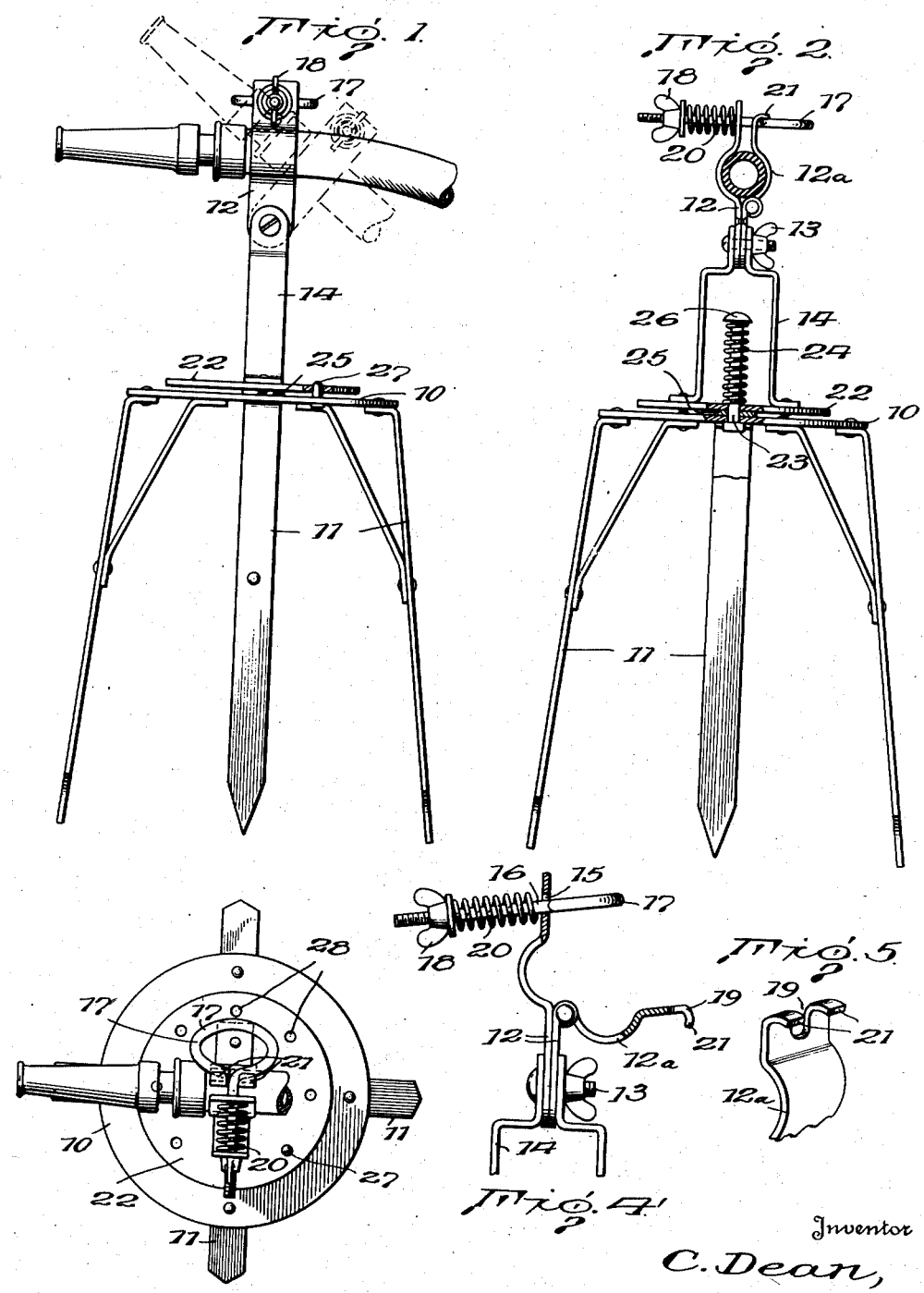
Inventor
C. Dean,
By Church & Church,
his Attorneys Patented Sept. 15, 1953

2,652,218

UNITED STATES PATENT OFFICE 2,652,218

HOSE NOZZLE SUPPORT

Charlie Dean, Charlotte, N. C.

Application January 23, 1948, Serial No. 4,020

1 Claim. (Cl. 248—86)

This invention relates to improvements in hose nozzle supports and, particularly, to a support for the nozzle of a hose of the so-called garden type.

The primary object of the invention is to provide a support or sprinkler stand of this type which is of simple, inexpensive construction, but sturdy and capable of efficient operation.

Another object is to provide a hose nozzle support in which the disposition or direction of the nozzle may be readily altered, together with means for releasably locking the support against movement under normal conditions.

A still further object of the invention contemplates the provision of a support in which the nozzle is supported on a bracket carried by a plate rotatably secured on a base member by a pivot pin, said pivot pin being protected by said bracket.

More specifically, the invention comprises interlocking elements on the base and rotatable plate for normally holding the latter against rotation, and a spring yieldingly urging said elements into engagement, the plate being tiltable on the base against the pressure of the spring for releasing said elements when it is desired to alter the position or direction of the nozzle.

With these and other objects in view, the invention consists in certain details of construction and combinations and arrangements of parts, all as will hereinafter be more fully described, and the novel features thereof particularly pointed out in the appended claim.

In the accompanying drawing—

Figure 1 is an elevational view of a stand or support constructed in accordance with the present invention;

Fig. 2 is a similar view taken at right angles to Fig. 1;

Fig. 3 is a top plan view;

Fig. 4 is an elevational view of the nozzle clamp; and

Fig. 5 is a perspective view of the pivoted side of said clamp.

The support comprises a base 10 adapted to be located a suitable distance above the surface of the ground, said base being provided with legs 11 in the present instance for this purpose. In order to facilitate firmly fixing the stand in the ground, as on a lawn, the lower extremities of said legs may be tapered to a point whereby they will more readily penetrate the ground.

The position of the hose nozzle is adapted to be altered both horizontally and vertically and, for this purpose, said nozzle is secured in a clamp pivoted to swing on a horizontal axis with respect to a plate which is rotatable on the base in a horizontal plane. Preferably, the clamp is composed of side members 12 pivoted on a pin 13 extending through the upper end of a bracket 14. One side of the bracket has an opening 15 therein for a latch consisting of a stem portion 16 formed with an enlargement 17 at one end and threaded at its opposite end for reception of a wing nut 18. The other clamp arm has a hinged section 12a formed with a notch 19 adapted to receive the end of the latch adjacent the latter's enlarged end, with the latter engaged beneath tongues 21 at opposite sides of the notch. A spring 20 on the latch stem yieldingly urges the hinged section 12a toward the other arm when the latch is engaged in notch 19. The clamp is shown in its open position in Fig. 4 and in closed position in Fig. 2 and, as will be understood, the nozzle gripped in the clamp can be released by merely disengaging the latch from notch 19, this being readily accomplished by compressing spring 20 and turning the enlarged end of the latch to disengage it from the tongues 21.

The bracket 14 is of a bifurcated construction, the two legs thereof being secured to a plate 22 overlying base 10. A pivot pin 23 extends through the base and plate to permit rotation of the latter, said pin 23 being of sufficient height or length to accommodate a coil spring 24. The legs of the bracket are attached to plate 22 at opposite sides of pivot pin 23 and thus afford protection for these parts.

Plate 22 is held in spaced relation to base 10 by an abutment such as washer 25 on the pin 23 and the spring 24, which is retained on the pin by an enlargement 26 yieldingly urging the plate toward said base. The plate and base are provided with interlocking elements to temporarily hold the plate against rotation. For instance, a pin 27 may engage with any one of a number of recesses or openings 28 in the plate. However, if it is desired to alter the position of the nozzle by rotating the plate, the latter can be tilted with respect to the base to an extent to disengage this pin 27. In other words, the plate can be rocked on the abutment or washer 25 against the pressure of spring 24 to free the plate which can then be rotated to bring a different opening 28 into registry with pin 27.

From the foregoing, it will be apparent that the present stand or support is of quite simple construction and can be produced at a very low cost figure. At the same time, it is of sturdy construction and due to the ability to adjust the clamp in a vertical plane and the rotary plate on which the clamp is carried in a horizontal plane, the stream of water issuing from a nozzle held in the clamp can be caused to assume any direction or elevation desired.

What is claimed is:

A hose nozzle support comprising a base, legs depending from said base for insertion into the earth, a vertical pivot pin projecting upwardly from said base, a plate supported on and overlying said base in spaced relation to it for rotation about and translation along said pin, a head on said pin spaced upwardly from said plate, a compression spring surrounding said pin between said plate and said head resiliently forcing said plate toward said base while permitting movement of said plate away from said base, a stop stem fixed on and projecting upwardly from said base, said plate being formed with a plurality of recesses for individually receiving said stop stem to retain said plate in any one of several selected positions relative to said base, a bifurcated bracket having its legs secured to said plate on opposite sides of said pivot pin to partially enclose said pin and spring, a horizontal pivot pin carried by said bracket above said vertical pivot pin, a hose clamp mounted on said horizontal pivot pin to turn about a horizontal axis, a wing nut on said horizontal pivot pin for drawing portions of said bracket into engagement with said clamp to retain said clamp in selected position adjusted about said horizontal axis to a desired angle, said clamp including a fixed portion and a hinged portion shaped to surround a hose section, said hinged portion being notched at its outer edge, and a disconnectable spring pressed latch having an enlarged end for connecting said portions to clamp them against a hose, said notched outer edge being adapted to engage said enlarged end.

CHARLIE DEAN.

References Cited in the file of this patent

UNITED STATES PATENTS

| Number | Name | Date |
| --- | --- | --- |
| 202,329 | Clarke | Apr. 16, 1878 |
| 925,680 | Burns | June 22, 1909 |
| 951,606 | Hanstein | Mar. 8, 1910 |
| 1,858,144 | Fariello | May 10, 1932 |
| 2,426,881 | Johnson et al. | Sept. 2, 1947 |

FOREIGN PATENTS

| Number | Country | Date |
| --- | --- | --- |
| 745,256 | France | Feb. 14, 1933 |